United States Patent
Dawane et al.

(10) Patent No.: US 10,992,400 B2
(45) Date of Patent: Apr. 27, 2021

(54) METHOD AND SYSTEM FOR EXTRACTION OF EVENT DATA FROM USER DEVICES

(71) Applicant: Vidhi Techinnovation Opportunities Network Private Limited, Gurgaon (IN)

(72) Inventors: Arpana Manoj Dawane, Gurgaon (IN); Manoj Ramchandra Dawane, Gurgaon (IN)

(73) Assignee: Vidhi Techinnovation Opportunities Network Private Limited

( * ) Notice: Subject to any disclaimer, the term of this patent is extended or adjusted under 35 U.S.C. 154(b) by 0 days.

(21) Appl. No.: 16/485,676

(22) PCT Filed: May 4, 2018

(86) PCT No.: PCT/IN2018/050277
§ 371 (c)(1),
(2) Date: Aug. 13, 2019

(87) PCT Pub. No.: WO2018/203351
PCT Pub. Date: Nov. 8, 2018

(65) Prior Publication Data
US 2020/0052805 A1    Feb. 13, 2020

(30) Foreign Application Priority Data

May 5, 2017  (IN) .............................. 201711015909

(51) Int. Cl.
*H04H 60/73* (2008.01)
*H04H 60/31* (2008.01)
(Continued)

(52) U.S. Cl.
CPC ............ *H04H 60/73* (2013.01); *H04H 60/31* (2013.01); *H04H 60/33* (2013.01); *H04N 21/44222* (2013.01); *H04N 21/84* (2013.01)

(58) Field of Classification Search
None
See application file for complete search history.

(56) References Cited

U.S. PATENT DOCUMENTS 7,196,805 B1 * 3/2007 Toebes ................... G06Q 50/10
348/211.1
9,331,892 B2 * 5/2016 Lindberg .............. H04L 41/142
(Continued)

FOREIGN PATENT DOCUMENTS

CN    104268172 A    1/2015
CN    106557470 A    4/2017

OTHER PUBLICATIONS

Search report from International Application No. PCT/IN2018/050277, dated Aug. 9, 2018.

*Primary Examiner* — Fernando Alcon
(74) *Attorney, Agent, or Firm* — Lerner, David, Littenberg, Krumholz & Mentlik, LLP

(57) ABSTRACT

Method and System for Extraction of Event Data from User Devices A method and system is provided for extraction of event data from user devices (216). The system (104) comprises a data identification component (210) configured to identify a metadata from a pre-existing location on the user device associated with predefined event types. The metadata is stored in the pre-existing location on occurrence of an event on the device and a change in a state of the event. The system further comprises a data extraction component (212) configured to extract the metadata from the pre-existing location. The data extraction component (212) generates event data based on the metadata. The system comprises a data transfer component (214) configured to detect a network (106) and on detection of the network (106) transfer the extracted event data to a backend server (102) over the network (106).

20 Claims, 5 Drawing Sheets

(51) Int. Cl.
*H04H 60/33* (2008.01)
*H04N 21/442* (2011.01)
*H04N 21/84* (2011.01)

(56) References Cited

U.S. PATENT DOCUMENTS

| | | | |
|---|---|---|---|
| 2003/0083938 A1* | 5/2003 | Smith | H04L 29/06 705/14.53 |
| 2008/0204595 A1* | 8/2008 | Rathod | H04N 21/84 348/465 |
| 2009/0082110 A1* | 3/2009 | Relyea | A63F 13/213 463/42 |
| 2010/0169910 A1* | 7/2010 | Collins | H04N 21/25891 725/14 |
| 2010/0269145 A1* | 10/2010 | Ingrassia | H04H 20/26 725/110 |
| 2011/0110515 A1* | 5/2011 | Tidwell | H04N 21/25891 380/200 |
| 2011/0145305 A1* | 6/2011 | Kamei | H04N 21/4147 707/822 |
| 2012/0079528 A1* | 3/2012 | Trimper | H04N 21/25891 725/31 |
| 2012/0151079 A1* | 6/2012 | Besehanic | H04N 21/84 709/231 |
| 2013/0263184 A1* | 10/2013 | Melnychenko | H04N 21/482 725/50 |
| 2013/0291001 A1* | 10/2013 | Besehanic | H04N 21/8358 725/20 |
| 2014/0020005 A1* | 1/2014 | Amselem | H04N 21/44008 725/19 |
| 2015/0244971 A1* | 8/2015 | Wickenkamp | H04N 5/782 386/295 |
| 2015/0248194 A1* | 9/2015 | Simpson | H04L 67/104 715/719 |

\* cited by examiner

METHOD AND SYSTEM FOR EXTRACTION OF EVENT DATA FROM USER DEVICES

CROSS-REFERENCE TO RELATED APPLICATIONS

The present application is a national phase entry under 35 U.S.C. § 371 of International Application No. PCT/IN2018/050277 filed May 4, 2018, which claims priority from Indian Application No. 201711015909 filed May 5, 2017, all of which are incorporated herein by reference.

FIELD OF THE INVENTION

The present invention relates to the field of data extraction. More particularly, the present invention provides a system and a method for accurately extracting event data from user devices in real-time.

BACKGROUND OF THE INVENTION

With proliferation of media consumption, such as print, television, audio, radio, video, and various digital content there is an increase in the need to gather and measure data related to consumption of media. For instance, media consumption data may be used for measuring number of consumers, demographic details of consumers, time of consumption of content and usage patterns of consumers.

Conventionally, measurement of media consumption data is done using television audience meters placed at households which measure clicks of remote used for switching channels. Other traditional approaches may include, for example, methods for measurement of radio FM based usage by using Paper Diary (PD) and Computer Aided Telephonic Interview (CATI) methods. Further, audio and video streaming applications such as YouTube™ employ digital methods for measurements.

The existing methods for measurement have several shortcomings including challenges relating to scalability and accuracy in the existing technologies. Specifically, the step of capturing event data from a device for measurement suffers due to inaccuracies in the method for extracting event data. For example, while using paper diary there exist challenges of forgetting the content that has been heard, which may lead to inaccuracies. While using CATI, call completion rates of panels is known to be very low. Portable Personal Meters (PPM), another technique used for measurements, uses audio character recognition of heard sound which is still not a completely accurate technology and leads to inaccuracies in event data extraction.

Thus, there is a need of a system and a method to mitigate the above mentioned drawbacks of the existing systems and methods for data extraction. There is a need for a system and method that accurately extracts event data from user devices. Also, there is a need for a system and method that accurately extracts event data from user devices in real-time.

SUMMARY OF THE INVENTION

It is to be understood that the present invention is not limited to the systems, and methodologies described, as there can be multiple possible embodiments of the present invention which are not expressly illustrated in the present invention. It is also to be understood that the terminology used in the description is for the purpose of describing the particular embodiments only, and is not intended to limit the scope of the present invention.

In various embodiments of the present invention, a method and a system for accurately extracting event data from user devices is provided. Examples of user devices may include, but are not limited to a laptop computer, a desktop computer, a notebook, a workstation, a mainframe computer, a server, a network server, a tablet, a mobile phone, and the like. The system is operatively connected to a user device which comprises a processing unit including at least one processor to implement the system on the user device. The processing unit may be retrofitted onto the user device or may be a pre-existing processor of the user device. In an exemplary embodiment of the present invention, the user device may be a smartphone running on an operating system. The operating system may be a real-time operating system or any other operating system. The system further comprises a memory unit coupled to the processing unit. Further, the system comprises a plurality of components to identify, extract and transfer event data from the user device. The plurality of components are coupled to the memory unit and executed by the processing unit. In an exemplary embodiment of the present invention, the memory unit is retrofitted onto the user device. In another exemplary embodiment of the present invention, the memory unit is a memory location allocated to the system on the user device to implement the system. In yet another exemplary embodiment of the present invention, the memory unit is a pre-existing memory unit of the user device.

In an embodiment of the present invention, the system is communicatively connected to a backend server through a network connection. The backend server is configured to analyze the data extracted by the system and provide consumption patterns to a user of the system. The system further includes at least one input/output interface for communication with a user.

In an embodiment of the present invention, the plurality of components is configured to identify and extract metadata associated with an event of one or more predefined event types upon occurrence of at least one of: the event and a change in a state of the event. The plurality of components is further configured to transfer an event data generated based on the metadata to the backend server. In an embodiment of the present invention, the metadata is stored in a pre-existing location on the user device and is generated for each event in the user device such that the metadata may comprise details related to each event. An event data is generated based on the metadata. In an embodiment of the present invention, a real-time operating system or normative operating system of the user device may generate the pre-existing location.

In an embodiment of the present invention, the plurality of components comprise at least a data identification component configured to identify whether the metadata in the pre-existing location on the user device corresponds to the one or more predefined event types. The plurality of components further comprises at least a data extraction component configured to extract the metadata on identification of the one or more predefined event types by the data identification component. The plurality of components further comprises at least a data transfer component configured to transfer the metadata to the backend server.

In an embodiment of the present invention, the data extraction component is configured to obtain metadata from an image data associated with the event of the one or more predefined event types if it is determined that the identified metadata does not correspond to a predetermined pattern associated with the one or more predefined event types. The data extraction component is further configured to generate an event data associated with the one or more predefined event types based on the obtained metadata. In another embodiment of the present invention, the data extraction component is configured to store the extracted event data in a data storage. In another embodiment of the present invention, the system comprises a component configured to perform at least one of the function of securing, encrypting, decrypting, indicating data extracted, depending on the veracity and sophistication of the user device, for securing the extracted metadata.

In another embodiment of the present invention, the data identification component is configured to identify whether the metadata in a pre-existing log file of the user device corresponds to the one or more predefined event types if the metadata is not identified in the pre-existing location on the user device.

In an embodiment of the present invention, the data transfer component is configured to transfer the extracted event data to a backend server over a network for further analysis. In another embodiment of the present invention, the data transfer component detects availability of network connection to the user device and on detection of network connectivity transfers the extracted event data to a backend server.

In an embodiment of the present invention, a method for accurately extracting event data from a user device in real-time is provided. The method is implemented using a system including a processing unit coupled to a memory unit. The system is connected to a backend server via a network. The method comprises identifying, by a processing unit, metadata associated with an event of one or more predefined event types upon occurrence of at least one of: the event and a change in a state of the event. The method further comprises extracting, by the processing unit, the metadata on identification of the metadata associated with the event of the one or more predefined event types. Further, the method comprises transferring, by the processing unit, an event data corresponding to the metadata to the backend server connected to the user device via the network.

In another embodiment of the present invention, the method comprises identifying whether the metadata is in a pre-existing location on the user device, and identifying whether the metadata from a pre-existing log file of the user device corresponds to the one or more predefined event types if the metadata is not identified in the pre-existing location created by the user device. In another embodiment of the present invention, the method comprises securing the metadata after extracting the metadata from the pre-existing location or the pre-existing log file.

In an embodiment of the present invention, the method comprises obtaining, by the processing unit, metadata from an image data associated with the event of the one or more predefined event types if it is determined that the identified metadata does not correspond to a predetermined pattern associated with the one or more predefined event types. The method further comprises generating, by the processing unit, an event data based on the obtained metadata. In an embodiment of the present invention, the method comprises storing the event data in a data storage of the system.

In an embodiment of the present invention, the method comprises detecting availability of the network connection between the user device and the backend server and transferring the event data to the backend server on detection of network connection with said user device. In another embodiment of the present invention, the method comprises making periodic detections for a network connection till the network connection is established.

In an embodiment of the present invention, the method further comprises removing the event data from the data storage after the event data is transferred to the backend server.

In an embodiment of the present invention, the plurality of components are structured as a single component unit with at least one processor to enable the functioning of the plurality of components. The processor of the single component unit is coupled to a memory for implementation of the system and method disclosed by the present invention. The processor of each of the plurality of components is further coupled to a memory.

The method as disclosed by the present invention is implemented using the system as described in the paragraphs above in conjunction with the components, memory unit and processors.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed in the drawings.

DETAILED DESCRIPTION OF THE INVENTION

The detailed description set forth below in connection with the appended drawings is intended as a description of various embodiments of the present invention and is not intended to represent the only embodiments in which the present invention may be practiced. Each embodiment described in this invention is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the figures inter-operate as explained in more detail below. Before setting forth the detailed explanation, however, it is noted that all of the discussion below regardless of the particular implementation being described, is exemplary in nature, rather than limiting.

Method steps of the invention may be performed by one or more processors which include special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays).

Figure 1:
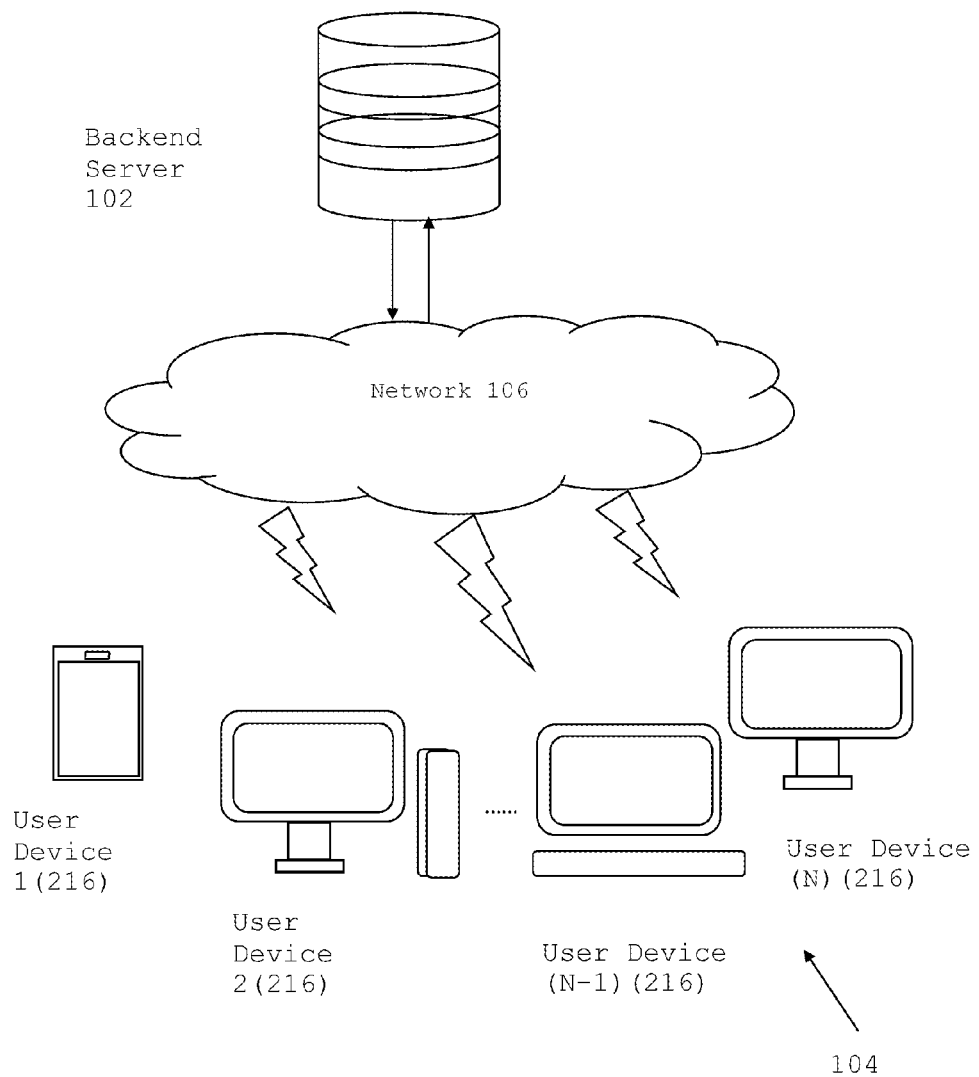
FIG. 1 illustrates an architecture for implementing the system and method for accurately extracting event data in real-time, in accordance with an embodiment of the present invention.
Figure 2:
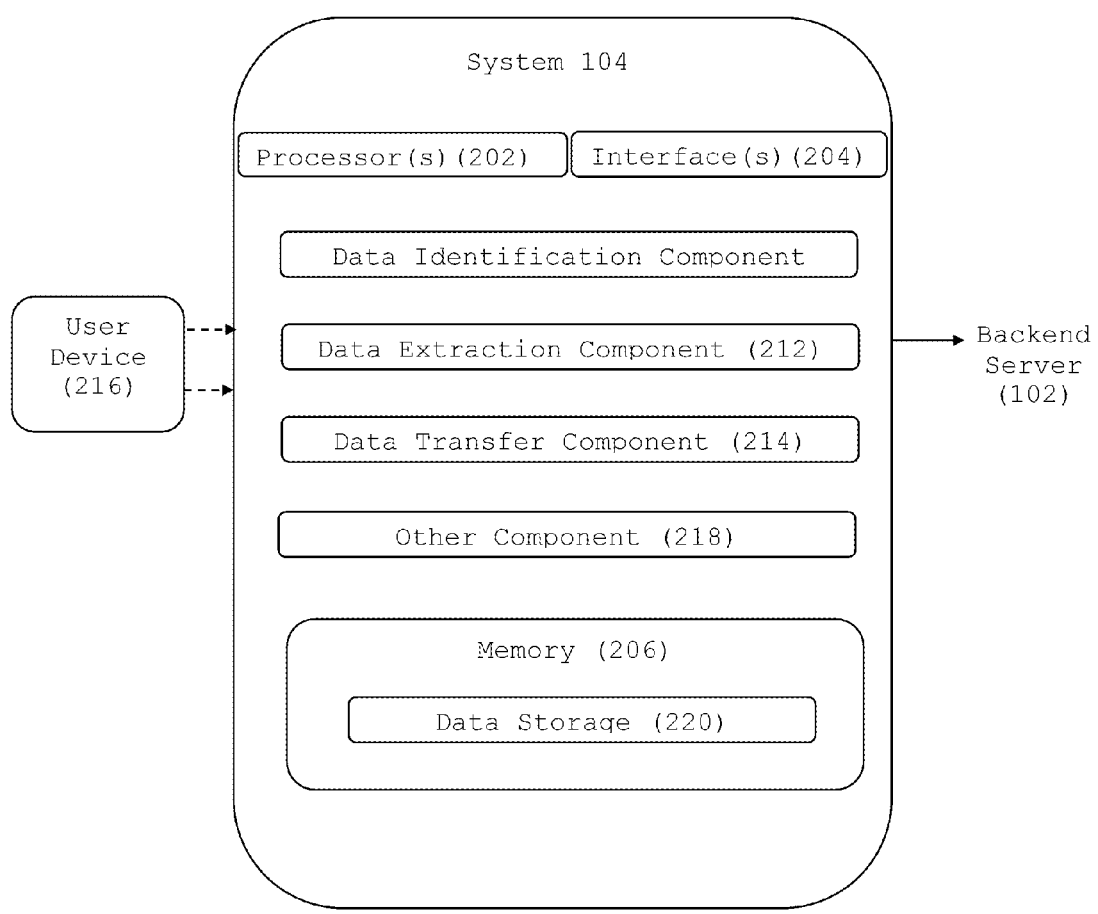
FIG. 2 illustrates a detailed block diagram of a system for accurately extracting event data, in accordance with an embodiment of the present invention.

FIG. 1 illustrates an architecture for implementing the system for accurately extracting event data from a user device in real-time, in accordance with various embodiments of the present invention. FIG. 2 illustrates a detailed block diagram of the system for accurately extracting event data from a user device (216), according to an embodiment of the present invention.

Referring to FIGS. 1 and 2, in an embodiment of the present invention, the user device (216) may be any computing device such as a mobile phone, tablet, computer, laptop and the like. In an exemplary embodiment of the present invention, the user device (216) may be a smartphone comprising a mobile operating system. Various media applications are stored in the user device (216), which are accessed by a user.

In an embodiment of the present invention, the system (104) is communicatively coupled to a backend server (102) through a network (106) and the user device (216). In an embodiment of the present invention, a plurality of user devices ("N" user devices) is connected to the network (106). In another embodiment of the present invention, at least one of the user device (216) from "N" user devices include the system (104) operatively connected to the user devices and running on the devices, the user device (216) having a real-time operating system or a normative operating system running thereon. In an embodiment of the present invention, the system (104) may use the processor associated with the user device for implementing the system (104) on the user device. In another embodiment, the system may use a processor specifically added to implement the system (104) on the user device (216).

Although the present invention is explained considering that the backend server (102) is implemented as a computing system, it may be understood that the backend server (102) may also be implemented as a variety of computing systems, such as a laptop computer, a desktop computer, a notebook, a workstation, a mainframe computer, a server, a network server, a tablet, a mobile phone, and the like. In an embodiment of the present invention, the backend server (102) is implemented in a cloud-based environment. In another embodiment of the present invention, the backend server (102) may also be configured to track the activities of the system (104). In various embodiments of the present invention, the backend server (102) is configured to analyze the event data to generate analysis report on user consumption preference and usage patterns of end-users (consumers). In an embodiment of the present invention, the backend server (102) is configured to transmit user consumption preference back to the user on his user device (216). In yet another embodiment of the present invention, the backend server (102) is configured to send the consumption patterns of users to third parties. The backend server (102) has requisite analytical capabilities, to analyze and generate event data which is received from the user device (216). The backend server (102) may be interfaced with one or more servers (not shown) for performing the analysis using external data sets. The analysis may be a correlation analysis which may be performed using specific algorithms that are written for very specific cases, depending on the use case of type of user device(s) (216) and type of external data sets being interfaced.

In an embodiment of the present invention, the network (106) may be a wireless network, a wired network or a combination thereof. The network may be implemented as one of the different types of networks, such as intranet, local area network (LAN), wide area network (WAN), the internet, and the like. The network (106) may either be a dedicated network or a shared network. The shared network represents an association of the different types of networks that use a variety of protocols, for example, Hypertext Transfer Protocol (HTTP), Transmission Control Protocol/Internet Protocol (TCP/IP), and the like, to communicate with one another. In another embodiment of the present invention, the network (106) may include a variety of network devices, including routers, bridges, servers, computing devices, storage devices, and the like. In yet another embodiment of the present invention, the devices may not be connected to the network (106) at all times and may connect and disconnect to the network (106) at various intervals of time.

In an embodiment of the present invention, the system (104) includes at least one processor (202). The at least one processor is a processor of the user device (216) configured to implement the system (104). In another embodiment of the present invention, the at least one processor (202) is a processor other than the processor of the user device (216) which is configured to implement the system (104) on the user device (216). The at least one processor (202) may be implemented as one or more microprocessors, microcomputers, microcontrollers, digital signal processors, central processing units, state machines, logic circuitries, and/or any devices that manipulate signals based on operational instructions. The system (104) further comprises an input/output (I/O) interface (204), and a memory (206). The I/O interface (204) may include a variety of software and hardware interfaces, for example, a web interface, a graphical user interface, and the like. The I/O interface (204) may allow the system (104) to interact with the user. Further, the I/O interface (204) may enable the system (104) to communicate with other computing devices, such as web servers and external data servers. The I/O interface (204) can facilitate multiple communications within a wide variety of networks and protocol types, including wired networks, for example, LAN, cable, etc., and wireless networks, such as WLAN, cellular, or satellite.

In an embodiment of the present invention, the memory (206) is the memory of the user device (216). In another embodiment of the present invention, the memory (206) is the memory other than the memory of the user device (216) which may be retrofitted onto the user devices (216). In another embodiment of the present invention, the memory (206) is a memory location allocated to the system (104) on the user device (216) for implementation of the system (104). The memory (206) may include any computer-readable medium for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment of the present invention, the system (104) defines one or more predefined event types associated with specific operations of the media applications. The specific operations of media applications is referred as events. In an exemplary embodiment of the present invention, the predefined event type may be defined as "accessing media applications". In another exemplary embodiment of the present invention, the predefined event type may be defined as accessing a specific application such as radio (FM/AM/Digital/Internet) application. Each time a media application is accessed on the user device (216), such access is identified by the system (104) as occurrence of an event. Further, each time a change is made to the accessed media application, such change is identified by the system (104) as occurrence of a change in a state of the event.

In an embodiment of the present invention, upon occurrence of an event and/or a change in a state of the event, the at least one processor (202) is configured to identify whether a metadata associated with the event stored in a pre-existing location corresponds to one or more predefined event types. The metadata includes details related to the particular media application accessed by the user. In an exemplary embodiment of the present invention, if the media application accessed on the user device (216) is a radio FM application, the metadata may include details, but is not limited to, the station tuned in, the song played, the album name etc. In an exemplary embodiment of the present invention, the metadata is stored in a pre-existing location on the user device (216) on occurrence of an event. In another exemplary embodiment of the present invention, the metadata is stored in the pre-existing location on the user device (216) upon occurrence of a change in a state of the event. In an exemplary embodiment of the present invention, the change in a state of the event for a radio FM application may include a change in the station tuned from a first station of a particular frequency to a second station of another frequency. In an embodiment of the present invention, the real-time operating system of a user device (216) generates the pre-existing location containing the metadata corresponding to each predefined event type on the user device (216).

The processor (202) is further configured to extract the metadata from the pre-existing location and store the extracted metadata in the memory (206). The processor (202) then extracts the metadata and generates event data based on the extracted metadata. The event data may be generated by including information on use of the accessed applications, such as time of accessing and exiting applications (timestamp), location, duration and the like to the metadata. In an exemplary embodiment of the present invention, the event data may include the time of accessing the radio (FM/AM/digital/internet) application, the time of exiting the radio (FM/AM/digital/internet) application, location of the user device (216), duration of access, to the extracted metadata.

Furthermore, the processor (202) is configured to transfer the extracted event data to a backend server (102) over a network (106) for further analysis of the event data. In yet another embodiment of the present invention, the processor (202) detects availability of network connection to the user device (216) and on detection of network connectivity transfers the extracted event data to the backend server (102).

In particular, in various embodiments of the present invention, the system (104) comprises a plurality of components configured to identify, extract and transfer event data from said user device (216). The plurality of components include a data identification component (210) configured to identify whether data metadata in a pre-existing location corresponds to a predefined event type. In an embodiment of the present invention, the system (104) comprises a data extraction component (212) configured to extract the metadata on identification of the predefined event type by the event identification component (210). The data extraction component (212) extracts the metadata if the metadata corresponds to a predetermined pattern. The predetermined pattern is a pattern that is identified as a standard pattern associated with metadata of each of the predefined event types that correspond to specific media applications. The data extraction component (212) is configured to extract the metadata before the identified event data is removed from the pre-existing location. In an exemplary embodiment of the present invention, the pre-existing location may be a FIFO stack of a predefined length wherein the metadata is removed from the location according to FIFO rules on occurrence of a new event on the user device (216). In another exemplary embodiment of the present invention, the pre-existing location may be a FILO stack of a predefined length wherein the metadata is removed from the location according to FILO rules on occurrence of a new event on the user device (216). In an embodiment of the present invention, the data extraction component (212) is configured to periodically monitor the pre-existing location for identification of metadata for a predetermined period of time. After the elapse of the predetermined time period, the data extraction component (212) extracts the metadata from a pre-existing log file on the user device (216). The data extraction component (212) is further configured to generate the event data based on the extracted metadata. Further, the data extraction component (212) is configured to store the event data in a data storage (220). The data storage (220), serves as a repository for storing extracted event data. In another embodiment of the present invention, the data extraction component (212) is configured to obtain metadata from an image data associated with the event of the one or more predefined event types if it is determined that the identified metadata does not correspond to the predetermined pattern. The image data may be stored in the pre-existing location on the user-device (216) in the event a media application is accessed. The data extraction component (212) is configured to generate the event data based on the obtained metadata and store the event data in the data storage (220).

In an embodiment of the present invention, the system (104) comprises a data transfer component (214) configured to transfer the event data stored in the data storage (220) to the backend server (102). The data transfer component (214)

may be configured to detect availability of a network connection on the user device (216) after storing of at least one event data in a specific location of the data storage (220). On detecting network connectivity, the data transfer component (214) transfers the event data stored at the location of the data storage (220), to a backend server (102). In another embodiment of the present invention, the data transfer component (214) is configured to remove the event data from the data storage (220) after a predetermined period of time.

In another embodiment, the system (104) comprises other component (218) configured to perform at least one of the function of securing, encrypting, decrypting, indicating the metadata extracted, depending on the veracity and sophistication of the user device (216). In an exemplary embodiment of the present invention, the other component (218) is a data securing component for securing the metadata extracted from the user device (216). In another exemplary embodiment of the present invention, the other component is a data encrypting component configured to encrypt the metadata. In yet another exemplary embodiment of the present invention, the other component (218) is a data decrypting component configured to decrypt the metadata for further processing and generating the event data.

Figure 3:
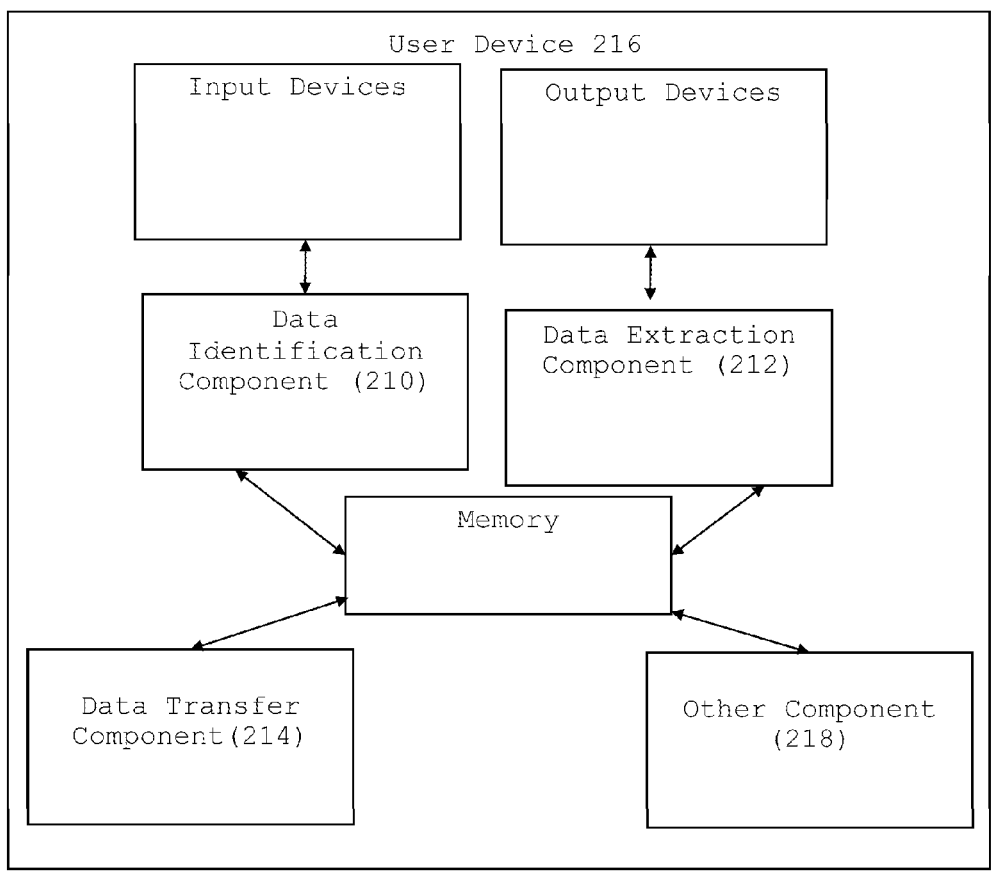
FIG. 3 illustrates a user device including various components coupled to a memory according to an embodiment of the present invention.
Figure 4:
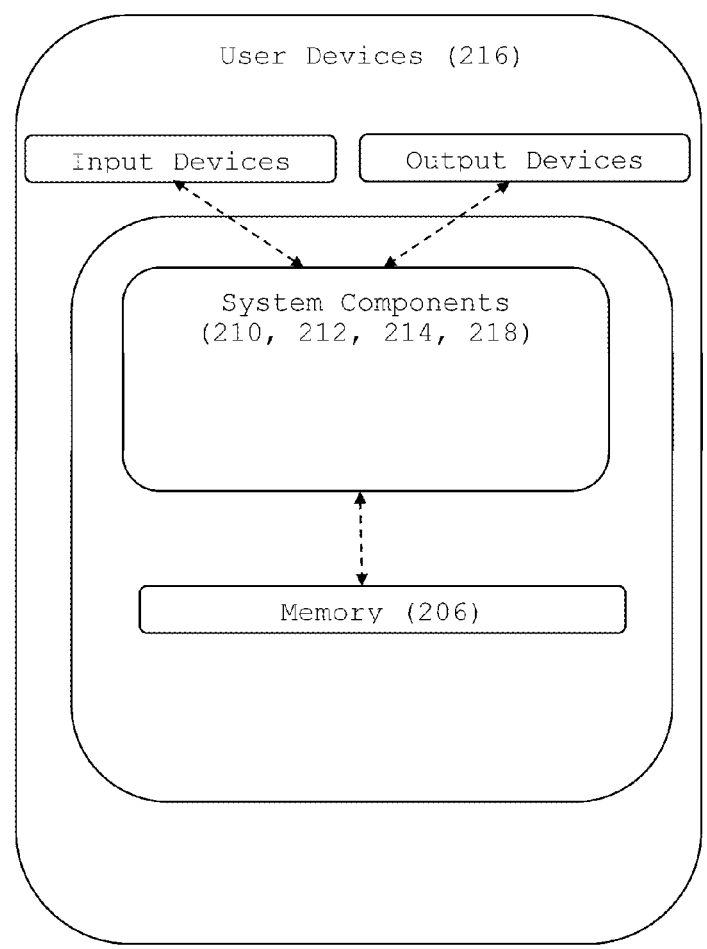
FIG. 4 illustrates a user device comprising system components coupled to input devices, output devices and a memory coupled to the system components, in accordance with an embodiment of the present invention.

In an embodiment of the present invention, the system (104) comprising of plurality of components (210, 212, 214, 218) is an external system communicatively coupled to network (106) and user device (216), as illustrated in FIG. 2. In an alternative embodiment of the present invention, the system (104) is a part of the user device, as illustrated in FIGS. 3 and 4. In FIG. 3, the user device (216) comprises a processing unit including the components (210, 212, 214, 218) coupled to a memory of the system (104). The components are implemented as hardware and each component may comprise a processor associated with the component for enabling the said component to perform its function. In another embodiment of the present invention, the processors of each component are coupled to a memory as shown in FIG. 3 wherein the memory may be a retrofitted memory or a pre-existing memory of the user device (216).

As illustrated in FIG. 4, the user device (216) comprises a processing unit consisting of a single component coupled to a memory. The single component may comprise at least one processor to enable the functionalities of all the components (210, 212, 214, 218)) as shown in FIG. 2 and FIG. 3. In an embodiment of the present invention, the single component may be a hardware component comprising at least one processor retrofitted to the user device (216). In another embodiment, the component may use a pre-exiting processor of the user device (216) for implementation.

Figure 5:
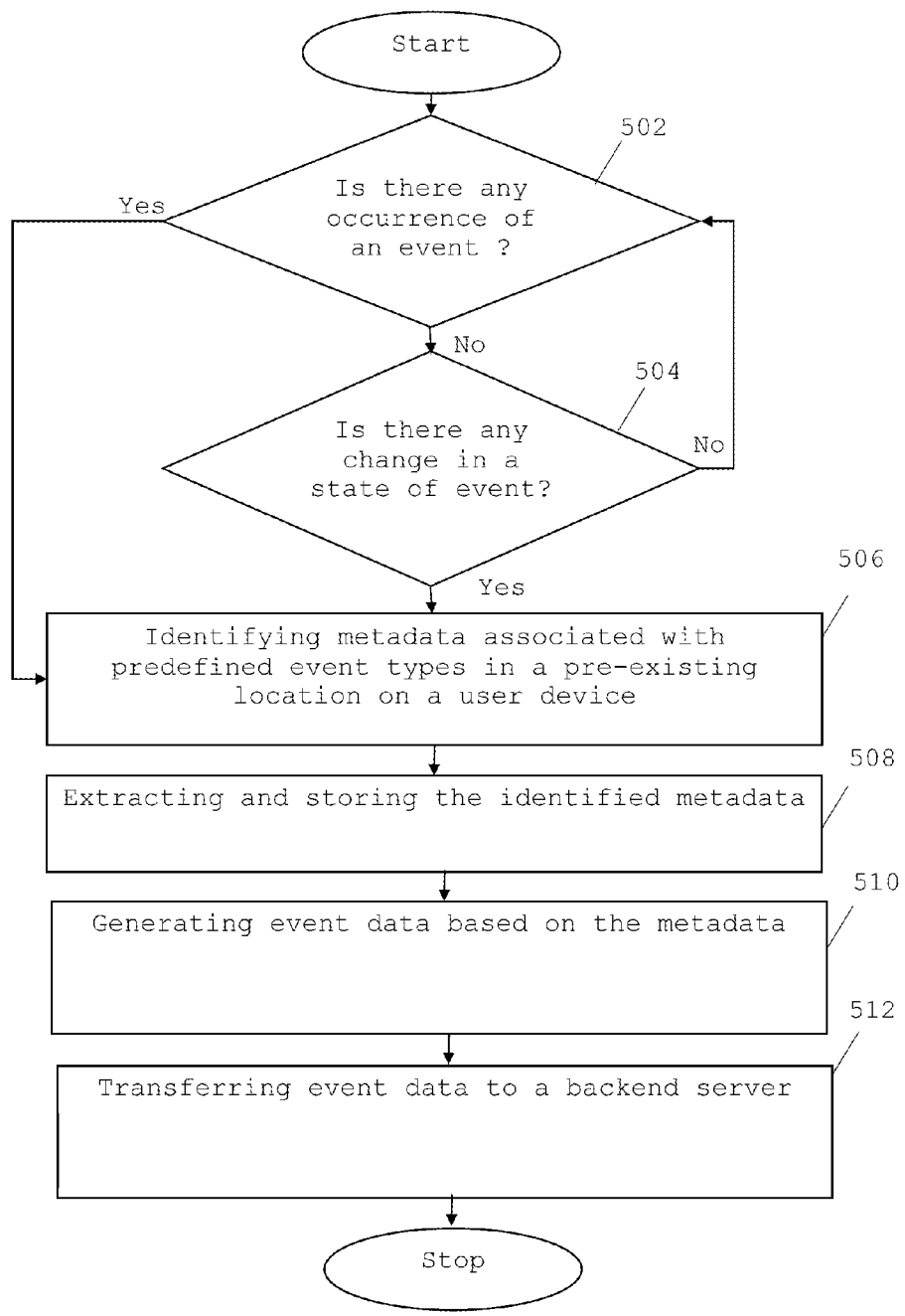
FIG. 5 is a flowchart illustrating a method for accurately extracting event data in real-time, in accordance with an embodiment of the present invention.

FIG. 5 is a flowchart illustrating a method for accurately extracting event data from user devices (216), in accordance with an embodiment of the present invention.

At step 502, it is determined if there is an occurrence of an event. At step 504, it is determined if there is a change in a state of an event. In an embodiment of the present invention, each time a media application is accessed on the user device (216), such access is identified by the system as occurrence of an event. Further, each time a change is made to the accessed media application, such change is identified by the system as occurrence of a change in a state of the event.

At step 506, if it is determined that there is an occurrence of an event (at step 502) or a change in a state of the event (at step 504), a metadata is identified in a pre-existing location on a user device (216) associated with one or more predefined event types. In an embodiment of the present invention, upon occurrence of an event of one or more predefined event types and a change in a state of the event, the pre-existing location on the user device (216) is accessed to identify a metadata corresponding to one or more predefined event types. In an exemplary embodiment of the present invention, the predefined event type may be defined as "accessing media applications". In another exemplary embodiment of the present invention, the predefined event type may be defined as accessing a specific application such as radio (FM/AM/Digital/Internet) application. In another embodiment of the present invention, if the event data is not identified as the predefined event type, the location is periodically rechecked to identify the metadata for a predetermined period of time. After elapse of the predetermined period of time, a pre-existing log file on the user device (216) is accessed to identify the metadata, if the metadata is not identified in the pre-existing location on the user device (216). In another embodiment of the present invention, it is determined that the identified metadata corresponds to a predetermined pattern. The predetermined pattern is a pattern that is identified as a standard pattern associated with metadata of each of the predefined event types that correspond to specific media applications. If it is determined that the identified metadata does not correspond to the predetermined pattern, an image data is accessed from the pre-existing location or the pre-existing log file. The metadata is obtained from the image data by converting the image data into text. The conversion may be performed using techniques known in the art.

At step 508, the identified metadata is extracted and stored in a memory unit. In an embodiment of the present invention, the metadata is extracted before the metadata gets deleted from the pre-existing location or the pre-existing log file. In an exemplary embodiment of the present invention, the pre-existing location may be a FIFO stack of a defined length where metadata gets deleted from the location due to addition of new data into the location. In another embodiment of the present invention, the location may be a FILO stack of a defined length where event data gets deleted from the location due to addition of new data into the location. The extracted metadata data is then stored in a memory unit (206).

At step 510, an event data is generated based on the extracted metadata. In an embodiment of the present invention, the event data may be generated by including information on use of the accessed applications, such as time of accessing and exiting applications (timestamp), location, duration and the like to the metadata.

At step 512, the event data is transferred to a backend server. In an embodiment of the present invention, a network connection with the user device is detected. In the event, a network connection is not detected, periodic detections are made to check for network connection. The detection of network connection is initiated only when at least one event data is extracted and stored in a data storage.

Various modifications to these embodiments are apparent to those skilled in the art from the description and drawings herein. The principles associated with the various embodiment defined herein may be applied to other embodiments. Therefore, the description is not intended to be limited to the embodiments shown along with the accompanying drawings but is to be provided broadest scope consistent with the principles and novel and inventive features describe/disclosed or suggested herein. Any modifications, equivalent substitutions, improvements etc. within the spirit and principle of the present invention shall all be included in the scope of protection of the present invention.

We claim:

1. A system for extracting data in real-time from a user device, the system comprising:
 a processing unit including at least one processor; and
 a memory unit coupled to the processing unit, the processing unit configured to:
  extract, from the user device, metadata generated upon, and associated with, an event occurring on the user device, wherein the event includes at least one of accessing or closing an application or a change made to the application, and wherein the metadata is extracted upon occurrence of the event and based on identifying that the metadata corresponds to one or more predefined event types;
  generate event data based on the extracted metadata, wherein the event data includes information associated with use of the application; and
  transfer the event data to a backend server.

2. The system as claimed in claim 1, wherein
 the metadata is stored in a pre-existing location on the user device, wherein the processing unit is further configured to:
 extract the metadata based on identification of the one or more predefined event types before the generated event data is removed from the pre-existing location, and
 wherein the event data comprises information associated with use of the application including time of accessing and exiting the application, location of the user device, and/or duration of access of the application.

3. The system as claimed in claim 2, wherein the processing unit is further configured to:
 obtain other metadata from image data associated with the event based on identification of the one or more predefined event types if it is determined that the identified metadata does not correspond to a predetermined pattern corresponding to a specific application type associated with the one or more predefined event types; and
 generate the event data based on the obtained other-metadata.

4. The system as claimed in claim 2, wherein the processing unit is further configured to identify whether other metadata in a pre-existing log file of the user device corresponds to the one or more predefined event types if the metadata is not identified in the pre-existing location on the user device.

5. The system as claimed in claim 1, wherein the system is communicatively connected to the backend server through a network connection for transferring the event data to the backend server for measuring consumption patterns based on the event data.

6. The system as claimed in claim 1, wherein the system is operatively connected to an operating system of the user device.

7. The system as claimed in claim 2, wherein the pre-existing location for the metadata is generated by an operating system of the user device.

8. The system as claimed in claim 1, wherein the processing unit is further configured to perform at least one of securing, encrypting, decrypting and/or indicating the metadata extracted from the user device.

9. The system as claimed in claim 1, wherein the processing unit is further configured to store the event data in a data storage prior to transferring the event data to the backend server.

10. The system as claimed in claim 9, wherein transferring the event data to the backend server includes transferring the event data stored in the data storage to the backend server.

11. The system as claimed in claim 10, wherein the processing unit is further configured to detect availability of network connection between the user device and the backend server and transfer the event data to the backend server on detection of network connection with the user device.

12. The system as claimed in claim 10, wherein the processing unit is further configured to periodically remove the event data from the data storage on the user device.

13. A method for extracting data from a user device in real-time, wherein the method is implemented by a processing unit coupled to a memory unit, the method comprising:
 identifying, by the processing unit, metadata generated upon, and associated with an event occurring on the user device, wherein the event includes at least one of accessing or closing an application or a change made to the application;
 determining, by the processing unit, the metadata corresponds to one or more predefined event types;
 extracting, by the processing unit, the metadata from the user device based on the identification that the metadata corresponds to the one or more predefined event types;
 generating, by the processing unit, event data based on the extracted metadata, wherein the event data includes information associated with use of the application; and
 transferring, by the processing unit, the event data to the backend server.

14. The method as claimed in claim 13, wherein the step of extracting the metadata further comprises:
 obtaining, by the processing unit, other metadata from image data associated with the event based on identification the one or more predefined event types if it is determined that the identified metadata does not correspond to a predetermined pattern associated with the one or more predefined event types; and
 generating, by the processing unit, the event data based on the obtained other metadata.

15. The method as claimed in claim 13, wherein the step of identification comprises identifying whether the metadata is in a pre-existing location on the user device, and identifying whether other metadata from a pre-existing log file of the user device corresponds to the one or more predefined event types if the metadata is not identified in the pre-existing location created by the user device.

16. The method as claimed in claim 13, wherein transferring the event data to the backend server includes detecting availability of a network connection between the user device-and the backend server and transferring the event data to the backend server on detection of network connection with said user device.

17. The method as claimed in claim 13, wherein the step of transferring the event data to the backend server includes periodically monitoring for a network-connection till the network connection is established.

18. The method as claimed in claim 13, wherein the method further comprises removing the event data from a data storage after the event data is transferred to the backend server.

19. The method as claimed in claim 13, wherein the method comprises securing the metadata before generating the event data.

20. The system as claimed in claim 1, wherein the occurrence of the event includes accessing a radio application on the user device and the change in the state of the event for the radio application includes a change in the station tuned from a first station of a particular frequency to a second station of another frequency.

\* \* \* \* \*